United States Patent [19]

Hammer et al.

[11] Patent Number: 5,306,120
[45] Date of Patent: Apr. 26, 1994

[54] SYSTEM TO PROTECT AGAINST EROSION A BODY SUBJECTED TO AN AIRFLOW

[75] Inventors: Joachim Hammer, Rückersdorf; Rudolf Schindler, Neubiberg, both of Fed. Rep. of Germany

[73] Assignee: Eurocopter Deutschland GmbH, Fed. Rep. of Germany

[21] Appl. No.: 9,242

[22] Filed: Jan. 26, 1993

[30] Foreign Application Priority Data

Mar. 19, 1992 [DE] Fed. Rep. of Germany ....... 4208842

[51] Int. Cl.$^5$ ............................................. B64C 27/46
[52] U.S. Cl. ................ 416/224; 416/229 R; 416/241 R; 416/241 B
[58] Field of Search ............... 416/224, 229 R, 229 A, 416/241 R, 241 B

[56] References Cited

U.S. PATENT DOCUMENTS

| 3,144,349 | 8/1964 | Swingler et al. | 416/229 R |
| 3,758,233 | 9/1973 | Cross et al. | 416/229 A |
| 3,951,612 | 4/1976 | Gates et al. | 416/241 R |
| 4,745,033 | 5/1988 | Timmons | 416/241 R |
| 4,802,828 | 2/1989 | Rutz et al. | 416/241 B |

FOREIGN PATENT DOCUMENTS

| 0383466 | 8/1990 | European Pat. Off. . |
| 674727 | 4/1939 | Fed. Rep. of Germany . |
| 3415465 | 10/1985 | Fed. Rep. of Germany . |
| 3527912 | 2/1987 | Fed. Rep. of Germany . |
| 3712705 | 10/1987 | Fed. Rep. of Germany . |
| 3825200 | 2/1990 | Fed. Rep. of Germany . |
| 2054071 | 4/1971 | France . |
| 2105163 | 4/1972 | France . |

OTHER PUBLICATIONS

Abstract of Japanese Publication No. JP-A-62 133 060, vol. 011, No. 361 25, Nov. 1987.
Abstract of Japanese Publication No. JP-A-22 94 484, vol. 015, No. 068 18, Feb. 1991.

Primary Examiner—Edward K. Look
Assistant Examiner—James A. Larson
Attorney, Agent, or Firm—Evenson, McKeown, Edwards & Lenahan

[57] ABSTRACT

A system for protecting against erosion the surface of a body which is subjected to an airflow and consists essentially of a fibrous material or a fiber-reinforced plastic material, such as a rotor blade, has a metallic coating which, in the respective area to be protected, covers the surface in several layers. The primary layer of the coating consists of aluminum or a similar material with a modulus of elasticity that is approximately identical to that of the material on the surface of the body. The primary layer, in the form of a sheet glued to the surface, is coated with a two-phase material, in which particles of metallic oxide and/or metallic carbide and/or metallic nitride compounds are embedded in a finely distributed manner in a ductile, solid-solution-hardened matrix of a metallic but non-ferrous material.

4 Claims, 1 Drawing Sheet

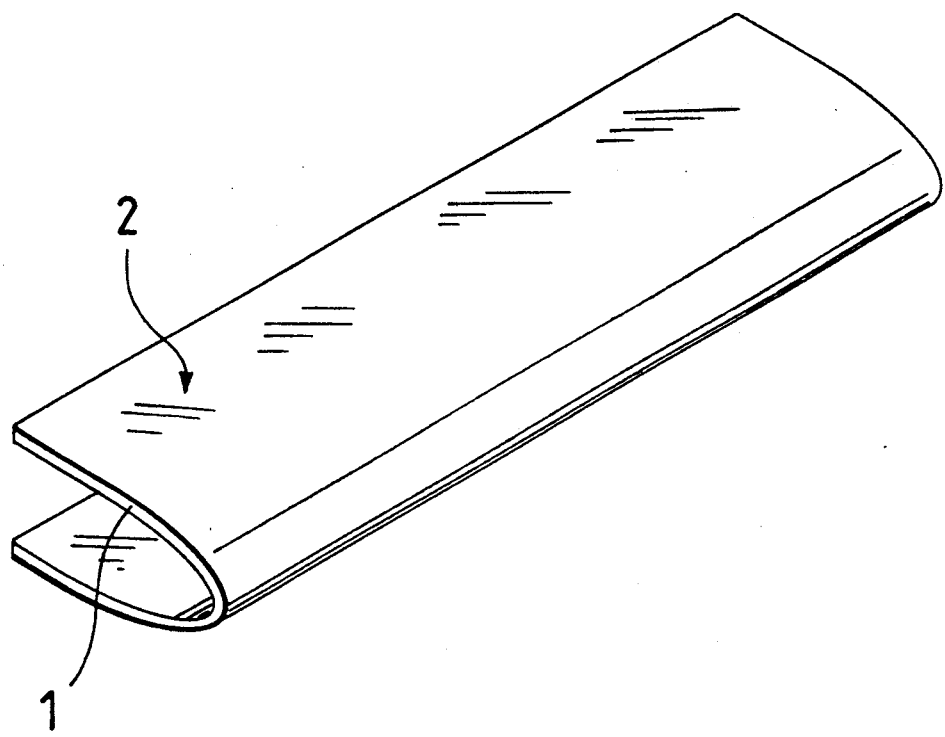

SYSTEM TO PROTECT AGAINST EROSION A BODY SUBJECTED TO AN AIRFLOW

BACKGROUND AND SUMMARY OF THE INVENTION

This invention relates to a system for protecting against erosion and, in particular, to protecting a surface of a body which is subject to airflow. The body may consist essentially of a fibrous material or of a fiber-reinforced plastic material, such as for a rotor blade, having a metallic coating which, in the respective area to be protected, covers the surface in several layers. The primary layer of the metallic coating consists of aluminum or a similar material with a modulus of elasticity that is approximately identical to that of the material on the surface of the body.

A protective covering of this type, which comprises an outer layer, for example, made of silver, which is applied to the primary aluminum layer by means of metal spraying, according to the German Patent Document DE-PS 674 727, has not been successful in the case of wooden propellers because of a lack of sufficient elasticity and strength of the selected metals. For helicopter rotor blades made of fiber-reinforced plastic materials, according to the German Patent Document DE-OS 37 12 705, erosion shields (also so-called erosion protection shells) made of corrosion-resistant steel or titanium are provided. These metals, however, require a hot forming of the individual erosion shield in order to adapt it with sufficient precision to the blade surface to be protected. Since, in addition, the metals have a relatively high modulus of elasticity in comparison to the composite material of the helicopter rotor blade, while the helicopter rotor blade is stressed, high tensions cannot be excluded in the adhesive connection between the erosion shield and the blade surface. This also applies to the cold-formable titanium alloy which is suggested in German Patent Document DE-OS 37 12 705 for erosion shields and in which the proportion of titanium amounts to only 76%. So far, the most frequent failure criterion for rotor blades, specifically detachments of the erosion shields, cannot yet be sufficiently reduced.

It is therefore an object of the present invention to provide an erosion protection system of the above-described type, i.e., with a primary layer made of a material having an approximately identical modulus of elasticity as the material on the surface to be protected, and which, at the same time, has an erosion resistance with respect to rain, sand particles and the like and which at least corresponds to the erosion protection system consisting of steel or titanium.

For an erosion protection system of the above-described type, this object is achieved by providing a metallic coating which, in the respective area to be protected, covers the surface in several layers. The primary layer of the metallic coating consists of aluminum, or aluminum alloy or a similar material with a modulus of elasticity that is approximately identical to that of the material on the surface of the body. The primary layer, in the form of a sheet glued to the surface, is coated with a two-phase material, in which particles of metallic oxide and/or metallic carbide and/or metallic nitride compounds are embedded in a finely distributed manner in a ductile, solid-solution-hardened matrix of a metallic but non-ferrous material. Therefore, the erosion protection according to the present invention has on the one hand the advantage that virtually an expansion compatibility exists between the protected surface and its "metal sheet" primary layer, and therefore an overstressing of its adhesive connection while stressing the protected body (such as the rotor blade) is impossible. On the other hand, the hard particles (so-called "dispersoids") in the coating of the metal sheet ensure a high resistance to erosion even when the stress by rain and sand particles varies. In addition, even in the case of damage to the coating, the metal sheet still ensures protection of the pertaining surface. Thus, the erosion protection according to the present invention still has so-called emergency running characteristics in the case of the rotor blade. Furthermore, any erosion damage is easily recognized because of the color difference between the coating and the metal sheet. If necessary, the erosion damage is even simply eliminated "on site", as illustrated by applying the two-phase material to the sheet via a high-speed flame spraying operation. Thus, not only the costs for repair and materials are reduced, but mainly the repair time is shortened which, in the case of the rotor blade of a helicopter or the like, results in longer operating intervals and thus in reduced operating costs.

Other objects, advantages and novel features of the present invention will become apparent from the following detailed description of the invention when considered in conjunction with the accompanying drawings.

BRIEF DESCRIPTION OF THE DRAWING

The sole drawing figure shows in a perspective view an erosion protection shell which is to be glued on the ram edge of a rotor blade according to the present invention.

DETAILED DESCRIPTION OF THE DRAWING

A rotor blade (not shown) is made of a fiber-reinforced plastic. The erosion protection shell consists of an aluminum sheet 1 which is shaped corresponding to the blade profile on the ram edge, and of an outer layer 2 of a two-phase metallic material. This two-phase metallic material, which was applied by means of high-speed coating, preferably high-speed flame spraying or electron-beam spraying, in the case of a metal sheet thickness of 1 mm, approximately in a thickness of 200 to 400 $\mu$m, essentially carries out the function of the erosion protection. For this purpose, particles of metallic oxide and/or metallic carbide and/or metallic nitride compounds are embedded in a finely distributed manner in a ductile, solid-solution-hardened matrix of a metallic but non-ferrous material. Nickel, chromium, cobalt, tungsten or their compounds may, for example, be used as the metallic but non-ferrous material. The compounds of aluminum oxide, chromium oxide, zirconium oxide, titanium carbide, tungsten carbide and titanium nitride are preferred for use as the particles that are finely distributed in the matrix.

The high-speed flame spraying easily permits the above-mentioned repair of erosion damage "on site".

As mentioned above, the aluminum sheet 1 essentially has the function of a primary layer which is to be connected with the assigned surface (by means of an adhesive, for example, on a plastic base) and which, because of a modulus of elasticity that is approximately identical to that of the fiber-reinforced plastic of the rotor blade (not shown), is compatible with its surface with respect to expansion. Accordingly, instead of the sheet 1 being made of aluminum or one of its alloys, a sheet made of another light metal, such as magnesium, may also be used.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A system for protecting against erosion, comprising:
    a helicopter rotor blade body having a surface subject to airflow;
    a metallic coating having at least two layers covering the surface in respective areas to be protected;
    a primary layer of said metallic coating being formed of a material having a modulus of elasticity that is approximately identical to that of the material on the surface of the body; and
    wherein the primary layer is in the form of a sheet glued to the surface and is coated with a two-phase material, said two-phase material having particles of at least one of metallic oxide, metallic carbide, and metallic nitride compounds embedded in a finely distributed manner in a ductile, solid-solution-hardened matrix of a metallic but non-ferrous material.

2. A system according to claim 1, wherein said body is made of at lest one of a fibrous and fiber-reinforced plastic material.

3. A system according to claim 1, wherein the primary layer is formed of an aluminum material.

4. A system according to claim 1, wherein said two-phase material is applied to said sheet via high-speed flame spraying.

* * * * *